United States Patent [19]
Peilloud

[11] Patent Number: 6,163,147
[45] Date of Patent: Dec. 19, 2000

[54] POSITION AND SPEED SENSORS FOR A ROTATING SHAFT

[75] Inventor: Fernand Peilloud, Hery sur Alby, France

[73] Assignee: The Torrington Company, Torrington, Conn.

[21] Appl. No.: 09/223,484

[22] Filed: Dec. 30, 1998

[30] Foreign Application Priority Data

Dec. 31, 1997 [FR] France .................................. 97 16783

[51] Int. Cl.[7] .................................................. G01B 7/14
[52] U.S. Cl. .............................. 324/207.22; 324/207.2; 324/207.25; 324/207.21
[58] Field of Search .......................... 324/207.2, 207.21, 324/207.22, 207.25; 338/32 R, 32 H

[56] References Cited

U.S. PATENT DOCUMENTS

| 4,041,371 | 8/1977 | Hini | ......................................... 324/368 |
| 5,017,776 | 5/1991 | Loewen | .................................. 250/231 |

FOREIGN PATENT DOCUMENTS 94 20 147 U   3/1995   Germany .

*Primary Examiner*—Christine K. Oda
*Assistant Examiner*—Subhash Zaveri
*Attorney, Agent, or Firm*—John C. Bigler

[57] ABSTRACT

A fixed sensor has two sensing elements delivering sinusoidal signals Γ, and is mounted in front of the magnetized face of an annular multipolar encoder. The axis ($\delta_C$) of the sensor (5) having the centers of the two sensing elements (51 and 52) is located at a distance ($R_0$) from the axis ($\delta_R$) of rotation of the encoder (4), and the encoder (4) has on its magnetized face (6) 2 m magnetic transitions between poles of opposite polarities, north and south, in the form of spirals, whose tracing is obtained by successive rotations by angles $\pi/m$ of the first transition around the center (0) of the encoder, defined in polar coordinates ($\mu$, $\theta$) by the equations:

$$\mu = (R_o^2 + a^2 \Omega^2)^{1/2}$$

$$\theta = \left(\arctan \frac{a\Omega}{R_o}\right) + \Omega$$

22 Claims, 12 Drawing Sheets

POSITION AND SPEED SENSORS FOR A ROTATING SHAFT

BACKGROUND OF THE INVENTION

This invention relates generally to a device for measuring the relative position and the speed of a rotating moving shaft, which device consists of an annular magnetic encoder, with multipolar magnetization, which is integrally connected to and concentric with the shaft, and of a sensor having at least two separate sensing elements, with Hall effect or with magnetoresistance devices, connected to a fixed frame. The invention relates more particularly to novel designs of multipolar encoders which make it possible to simplify the final assembly of the measuring devices and to use a sensor of a unique type.

It is known how to measure the speed and the position of a moving part by means of a sensor with two sensing elements arranged opposite a multipolar magnetic encoder. Generally, the geometric position of the two sensing elements is adjusted so that their centers are in quadrature in the alternating or sinusoidal magnetic field of the magnet. This situation is achieved when the distance between the centers of the sensing element corresponds to an odd number of quarters of the magnetic period of the encoder. The electrical signals delivered by the sensing elements are then in quadrature.

When, in a device which is not geometrically controlled, the signals delivered by the sensing elements are sinusoidal in form, it is also known how to control them in quadrature by appropriate electronic signal processing.

In the case of a rotation measurement, an arrangement consists of mounting an encoder concentrically on and integrally connected to a rotating shaft, which encoder is in the form of an annular disk, magnetized on one of its faces. The magnetic transitions defined between the sectors with north polarity and the sectors with south polarity are generally marked by spokes of the disk or of the encoder ring. The multipolar magnet consequently consists of a number equal to 2 m circular sectors or poles with angle $\pi/m$, with alternately opposite polarities, which determine m sectorial periods of $2\pi/m$ angular value.

The geometric control in quadrature in the magnetic field of the sensing elements of the sensor requires that the following dimensional equation be satisfied:

$$d = 2R * \sin[(2n+1) * \pi/4m]$$

where: d is the distance separating the centers of the sensing elements of the sensor, R is the reading radius of the encoder where the sensing elements are placed, and N is a whole number, which can be negative, zero or positive, and which allows the establishment of the states of quadrature.

This equality expresses that, for a given state of quadrature, for example, one-fourth, three-fourths or five-fourths of a period, and for a chosen number of periods m of the magnetic encoder, there exists an unambiguous relation between the distance d and the reading radius R.

One problem resulting from this arrangement is that for each new concept of a measuring device modifying either the number of periods of the encoder or the position of the sensor on the reading radius R, it is necessary to create a new sensor with two appropriately spaced sensing elements to ensure the state of quadrature, which increases the manufacturing costs. The manufacturing technologies used are preferably those which use step-and-repeat methods of sensing elements in discrete components on a support, where the precision of positioning is insufficient to allow the elimination of the need for control at the end of the assembly of each measuring device constructed.

Another problem resulting from this arrangement is due to the fact that the function of the frame which is used as a support for the sensor is generally ensured by parts with low precision of execution, which results in a lack of precision in the positioning of the sensor on the reading radius of the encoder and thus a lack of precision in the state of quadrature of the signals, if each measuring device is not controlled in the final assembly.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the invention, this is accomplished by providing a device for measuring the position and the speed of a rotating moving shaft. A fixed sensor has at least two sensing elements, delivering sinusoidal signals, mounted with a constant gap opposite a magnetized face of an annular multipolar encoder, centered over the shaft and integrally connected to it without rotational play. An axis ($\delta_C$) of the sensor (5) having the centers of two sensing elements (51 and 52) is located at a distance ($R_0$) from the axis ($\delta_R$) of rotation of the magnetic encoder (4) and the encoder (4) has on its magnetized face (6) 2 m magnetic transitions between poles of opposite polarity, north and south, in the form of spirals whose path of the first transition is defined in polar coordinates ($\mu$, $\theta$) by the equations:

$$\mu = (R_o^2 + a^2\Omega^2)^{1/2}$$

$$\theta = \left(\arctan\frac{a\Omega}{R_o}\right) + \Omega$$

or $$\mu = (R_o^2 + a^2\Omega^2)^{1/2}$$

$$\theta = \left(\arctan\frac{a\Omega}{R_o}\right) - \Omega$$

and the path of the (2 m−1) other spiral transitions is obtained by successive rotations by angles $\pi/m$ of this first transition around the center (0) of the encoder, equations in which $\Omega$ is the angle of rotation of the encoder around its center (0), $\mu$ is the modulus of the spiral measured from the center (0) of the encoder (4), $\theta$ is the argument of the spiral measured from its origin on the axis (0z) on which is measured the distance between axes ($R_0$), and a is a parameter of eccentricity of the spiral defined by the equation:

$$a = d*m*1/\Gamma$$

in which $\Gamma$ represents the phase angle between the two signals delivered by the two sensing elements (51 and 52) of the sensor (5), d represents the distance between the centers of the sensing elements of the sensor, and m represents the number of magnetic periods of the encoder.

The foregoing and other aspects will become apparent from the following detailed description of the invention when considered in conjunction with the accompanying drawing figures.

BRIEF DESCRIPTION OF THE DRAWING FIGURES

Elements bearing the same reference numerals in the different figures fulfill the same functions for the same results.

DETAILED DESCRIPTION

Figure 1:
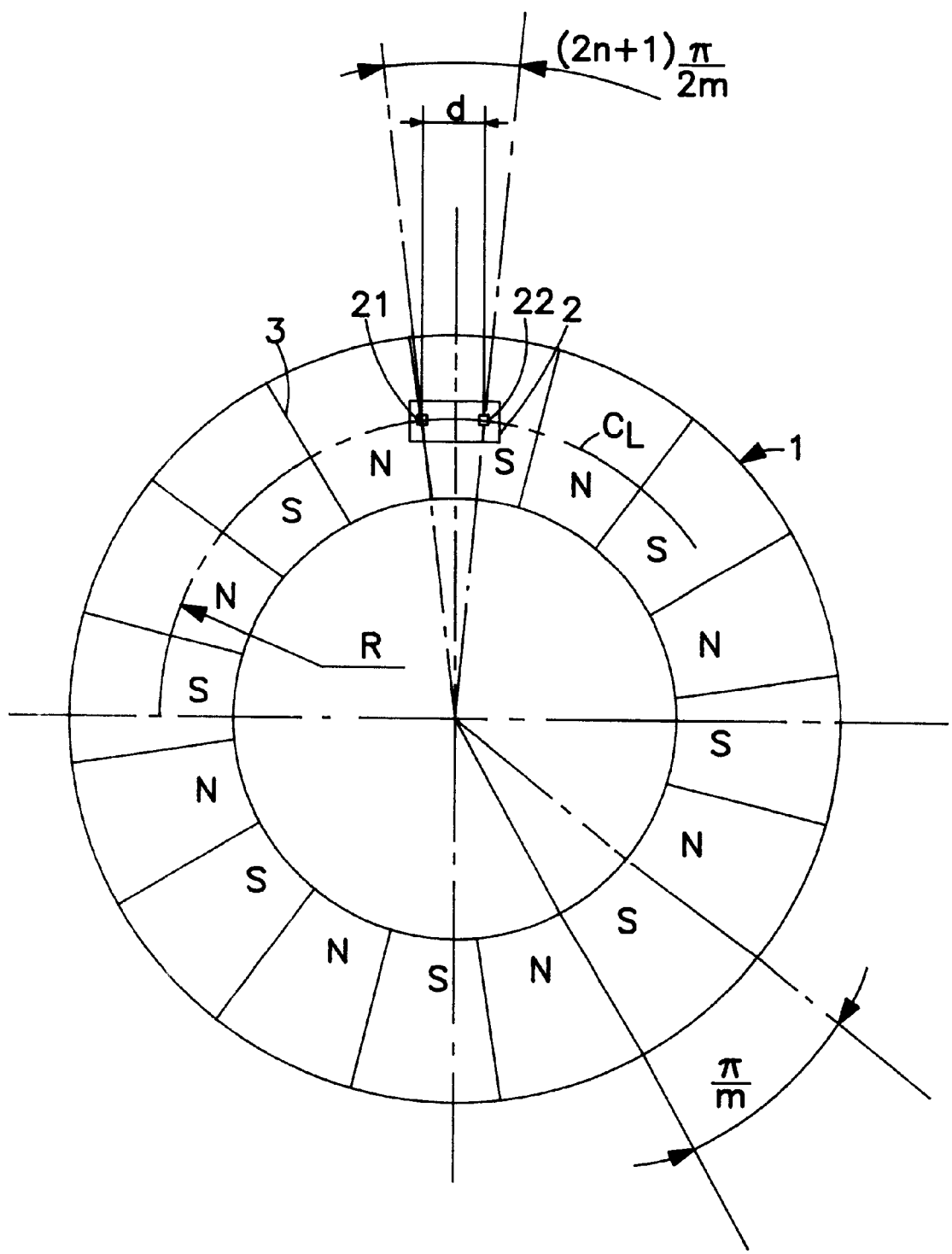
FIG. 1 illustrates a measuring device comprising a sensor and a magnetic encoder according to the prior art.

Referring now to the drawings, FIG. 1 illustrates a measuring device comprising a circular encoder 1, with annular shape, according to the prior art, comprising m magnetic periods north-south, concentrically connected without rotational play to a rotating shaft, not shown, opposite a sensor 2 comprising two sensing elements 21 and 22 whose centers are separated by a distance having a value d.

The 2 m magnetic transitions 3 between the north and south poles, marked by radii of the encoder, determine 2 m annular sectors with angular value π/m. The two sensing elements of the sensor 21 and 22, both located on the same circle $C_L$ having reading radius R, are in geometric quadrature in the magnetic field of the encoder if the following equation is satisfied:

$$d = 2\,R \ast \sin[(2n+1) \ast \pi/4m]$$

n being a whole number which can be negative, zero or positive.

In this manner, for an encoder presenting 2 m magnetic poles, the distance d can take on at most m distinct values for a given reading radius R.

Outside of these values, any difference with respect to the values of d and R fixed by the designer according to this equation results in deviations from quadrature, thus requiring the regulation of the quadrature after the assembly of the device. In addition, the design of a novel device comprising an encoder with different number of magnetic poles generally also leads to the design of a novel sensor having an adapted distance d. The conclusions to be drawn are identical if the two sensing elements are controlled for different reading radii.

Figure 2:
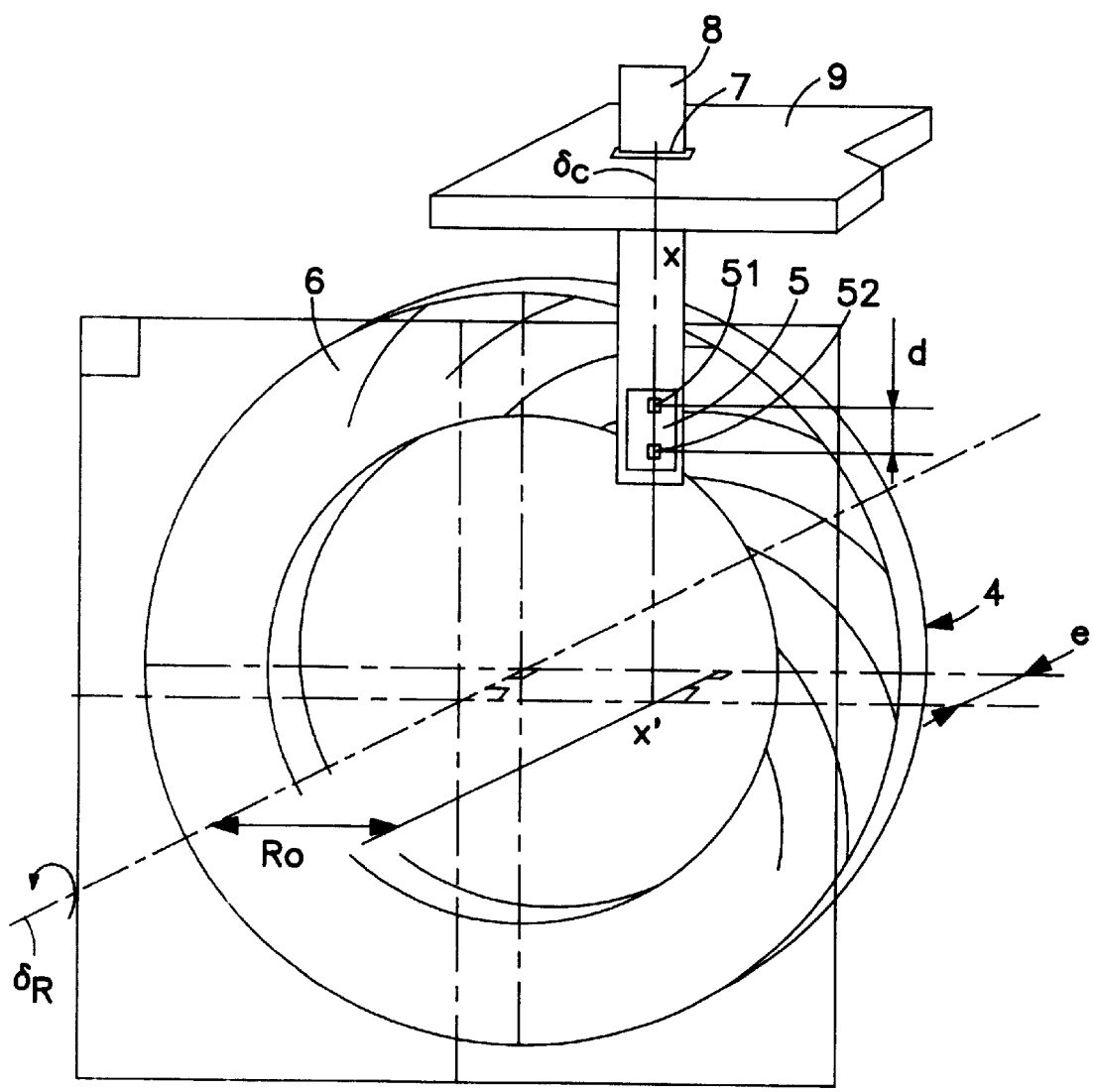
FIG. 2 illustrates a device for measuring position and speed according to the invention.

FIG. 2 illustrates a measuring device according to the invention, comprising a sensor 5, which is formed as an integrated circuit, for example, using microelectric means, which circuit has two elements 51 and 52 that are sensitive to the magnetic field, whose distance d between their centers is fixed at a unique and constant value, and for which the position of the axis connecting said centers is known. In addition, the measuring device comprises a magnetic encoder 4 that is concentric with and integrally connected to the rotating moving shaft, not shown, and which shaft has an axis of rotation $\delta_R$.

The sensor 5 is mounted in a plane P parallel to the magnetized face 6 of the encoder 4, so that the sensing elements 51 and 52 are opposite the magnetic pattern of the encoder with a gap distance e. The axis $\delta_C$ of the centers of the sensing elements belonging to this plane P is located at a distance $R_0$ from the axis of rotation $\delta_R$ of the device. A prismatic guide 7, provided between a sensor support 8 and a fixed frame 9, allows the implementation of this assembly plane of the sensor and it allows the distance $R_0$ chosen during the design of the device to be kept constant.

The axis $\delta_C$ is the axis on which the magnetic pattern of the encoder 4 is read by each of the sensing elements 51 and 52. The distance d between the centers of the two sensing elements is chosen so as to be compatible with the embodiment variant of the sensor. It represents a portion of the dimension of a pole of the encoder, which is preferably less than or equal to one-fourth of the period of the encoder magnet, measured along the axis of the centers of the sensing elements of the assembled device. It is possible to choose for the distance d values that are larger than one-fourth of the period without leaving the scope of the invention.

The axis $\delta_C$ is the axis on which the magnetic pattern of the encoder 4 is read by each of the sensing elements 51 and 52. According to the invention, the separation d being chosen, the situation of quadrature or a situation of phase shift with constant value is obtained, regardless of the position of the sensor support 8 which moves on the axis $\delta_C$, provided that the sensing elements 51 and 52 both remain opposite the magnetic pattern of the encoder 4.

The annular encoder 4, which is made of one of the constituent materials used for permanent magnets known to persons skilled in the art, is magnetized on one of its faces 6, according to a rotating scrolling succession of north and south magnetic patterns, constituting m magnetic periods. According to a fundamental characteristic of the invention, one of the magnetic transitions separating two poles of opposite polarity is represented by one of the following systems of equations using polar coordinates (F, 2):

$$\mu = (R_o^2 + a^2\Omega^2)^{1/2}$$
$$\theta = \left(\arctan\frac{a\Omega}{R_o}\right) + \Omega$$

or $$\mu = (R_o^2 + a^2\Omega^2)^{1/2}$$
$$\theta = \left(\arctan\frac{a\Omega}{R_o}\right) - \Omega$$

All the magnetic transitions of the encoder are defined by 2 m successive rotations by an angle π/m of the first magnetic transition with respect to the center of the encoder, resulting in 2 m transitions or m magnetic periods.

These two systems of equations allow the definition of two families of spirals where:

$R_0$ is a construction parameter of the device as defined above,

Ω is the current angle of rotation of the encoder measured at its center, and a is a constant chosen as a function of the distance d of the centers of the sensing elements of the sensor and as a function of the number of magnetic periods chosen for the encoder.

$R_0$, a and Ω allow the definition, for each one of the values of Ω, of the position of the transition expressed in polar coordinates with respect to the center of the encoder by its modulus $\mu$ and its phase θ of origin in agreement with the origin of Ω.

FIG. 3 illustrates the path according to the invention of a magnetic transition 10 between two poles north and south on an encoder 4 with center 0. The axis $\delta_C$ which is located at a distance $R_0$ from the center 0 intersects the axis 0z, on which the distance $R_0$ to the point X' is measured. The point X' of the axis $0z$ is the origin of the magnetic transition 10 in the form of a spiral, which extends to the external limit of the encoder.

A point of the transition 10 is defined by its polar coordinates $(\mu, \theta)$ which are, on the one hand, the modulus $\mu$, and, on the other hand, the angle $\theta$ of the origin $0z$ of the phase, which are defined by the following equations:

$$\mu = (R_o^2 + a^2\Omega^2)^{1/2}$$

$$\theta = \left(\arctan\frac{a\Omega}{R_o}\right) + \Omega$$

where, the magnitude $a\Omega$ is measured on the axis $\delta_C$ from the origin X', a is a constant calculated as a function of the distance d between the sensing centers of the sensor and the number of magnetic periods of the encoder, $\Omega$ is the angle of rotation in the positive direction around the center 0 of the encoder 4 which generates, from the point on the axis $\delta_C$ with ordinate $a\Omega$, the corresponding transition 10 with a phase shift by an angle $\theta$ with respect to the origin.

Figure 3A:
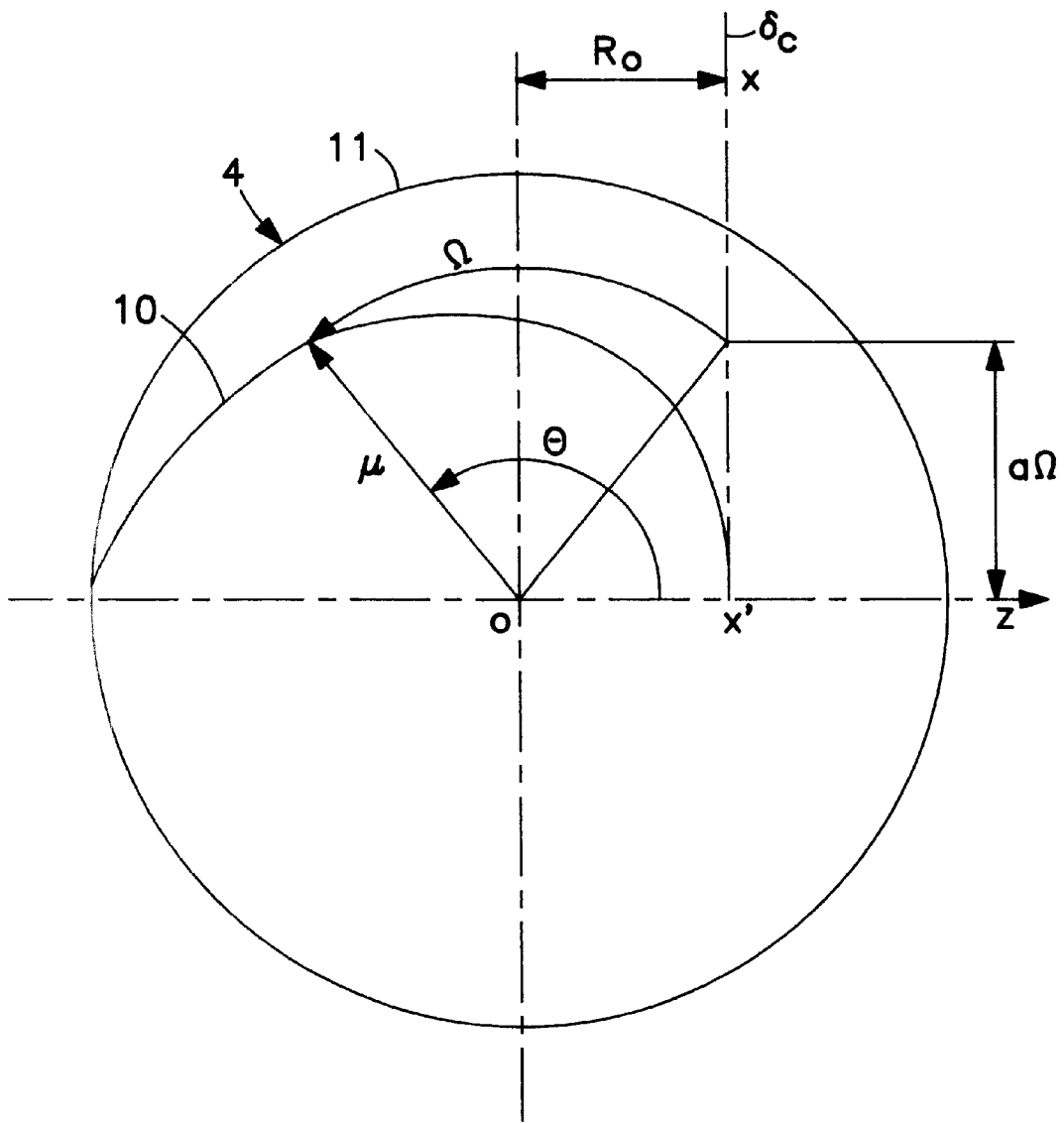
FIGS. 3a and 3b are two examples of tracings of a magnetic transition of an encoder according to the invention.
Figure 3B:
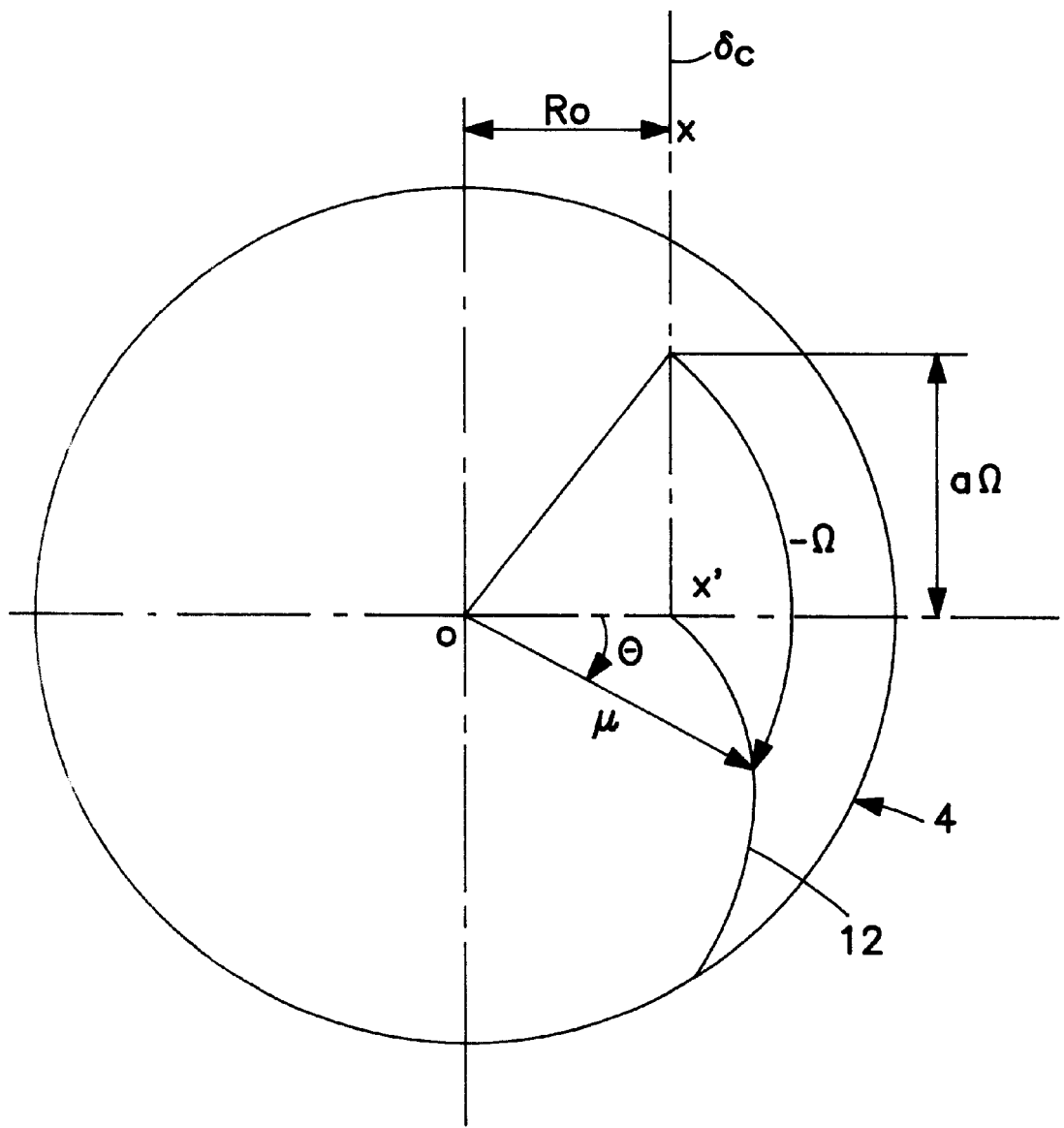

FIG. 3b represents the path according to the invention of a magnetic transition 12 between two poles, north and south, on an encoder 4 which satisfies the following equations using polar coordinates $(\mu, \theta)$:

$$\mu = (R_o^2 + a^2\Omega^2)^{1/2}$$

$$\theta = \left(\arctan\frac{a\Omega}{R_o}\right) - \Omega$$

with a rotation in the opposite direction by angle $-\Omega$ of the point with ordinate as belonging to the axis $\delta_C$, to generate the corresponding point of the transition 12.

Figure 4:
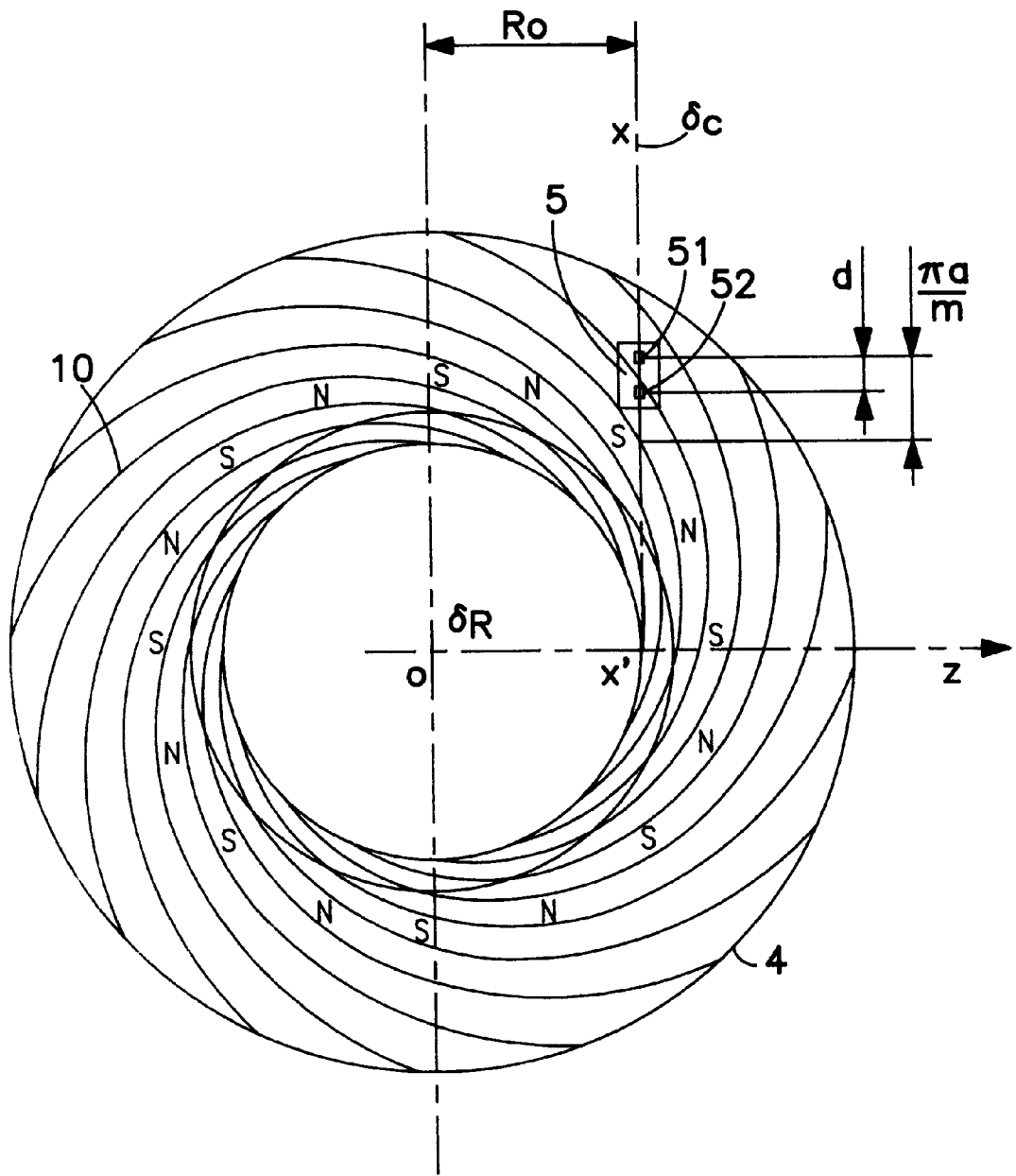
FIGS. 4 through 9 illustrate different embodiments of a magnetic encoder according to the invention.

FIG. 4 illustrates a first embodiment of a magnetic encoder according to the invention, in which the path of all the transitions between the north and south magnetic poles, that are obtained by rotations, around the center 0 of the encoder, of the transition 10 as described in FIG. 3a [sic]. Each transition is derived from the immediately consecutive transition by rotation by an angle $\pi/m$.

The succession of these transitions 10 defines a succession of 2 m north or south poles of the encoder magnet 4. The axis $\delta_C$ with origin X' located on the axis $0z$, at a distance $R_0$ from the center 0 of the encoder 4, intercepts the succession of transitions 10 at a constant pitch equal to $\pi a/m$, whereas the circumferential pitch is by construction equal to $\pi/m$.

The sensor 5 is placed in such a manner that the centers of the sensing elements 51 and 52, which are separated by a distance d, are on the axis $\delta_C$. Regardless of the position of the sensor 5 on the axis $\delta_C$, the signals delivered by the sensing elements 51 and 52 remain in a constant phase shift, whose value is uniquely a function of the relative value of the distance d, chosen as distance separating the centers of the sensing elements of the sensors, at the value of the pitch $\pi a/m$ of the encoder measured on the axis $\delta_C$. This phase shift of the signals delivered by the elements 51 and 52 also remains constant when the encoder turns about its axis 0.

As a nonlimiting example, it is possible to choose a distance d which allows the obtaining of signals, delivered by the sensing elements 51 and 52, in quadrature, according to the equation:

$$d = \frac{\pi a}{2m}$$

One can also choose, still as a nonlimiting example, a smaller value of d, corresponding to a phase shift of the signals which is less than the quadrature, to allow a miniaturization of the sensor while at the same time keeping the advantage of a constant phase shift, regardless of the position of the sensor 5 on the axis $\delta_C$, with or without rotation of the encoder.

Figure 5:
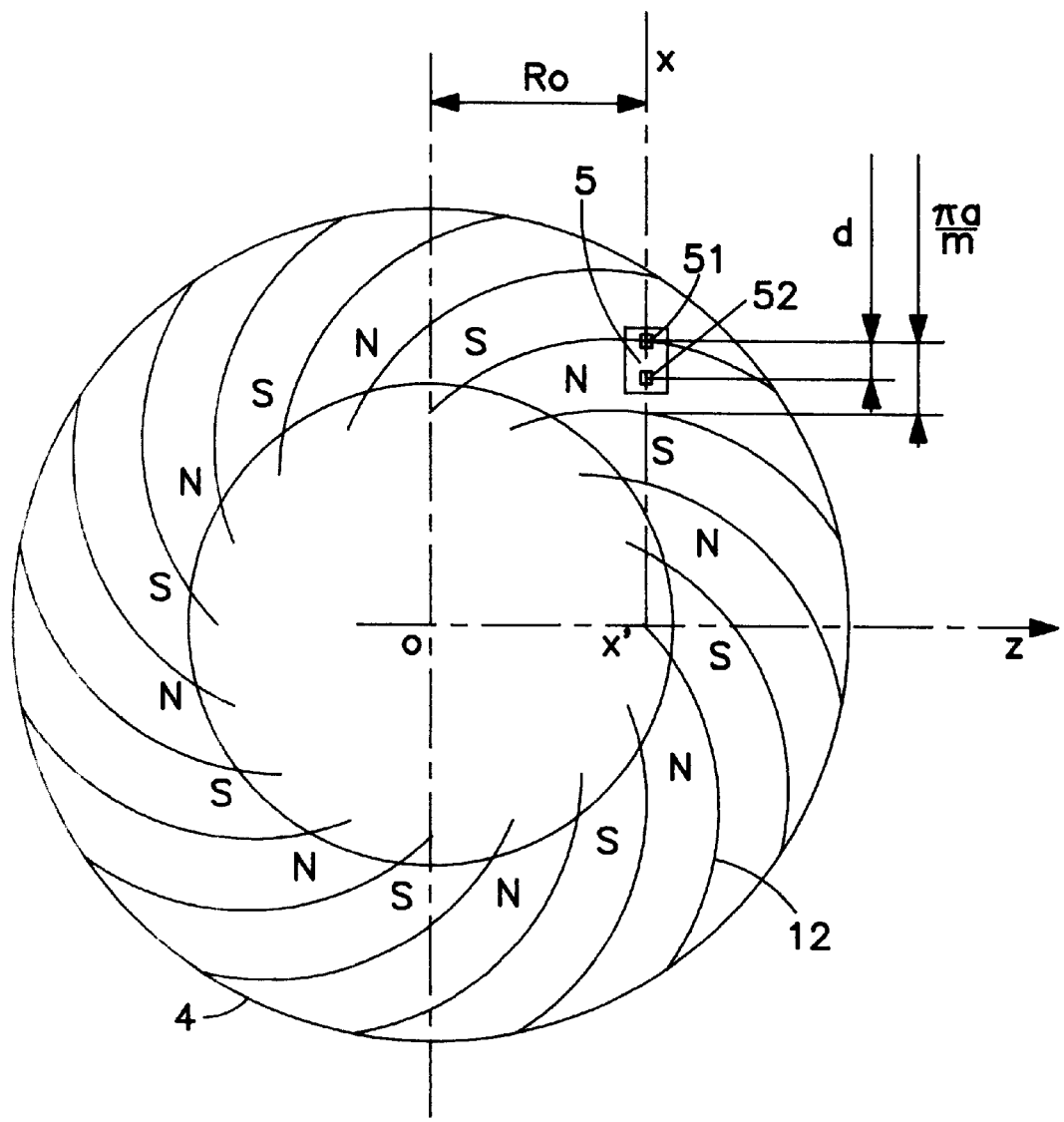

FIG. 5 illustrates a second embodiment of a magnetic encoder according to the invention, in which the path of all the magnetic transitions between the poles obtained by the rotations, around the center 0 of the encoder, of the transition 12 as described in FIG. 3b. Each transition is derived from the adjacent transition obtained by rotation by an angle $\pi/m$. The succession of these transitions defines a succession of m periods or 2 m north or south poles of the encoder magnet. The axis $\delta_C$ with origin X' located on the axis $0z$, at a distance $R_0$ from the center 0 of the encoder 4, intercepts the succession of transitions according to a constant pitch equal to $\pi a/m$, whereas the circumferential step is by construction equal to $\pi/m$.

The expected characteristics for sensor 5, whose centers of the sensing elements are located on the axis $\delta_C$, are identical to those described in FIG. 4.

Figure 6:
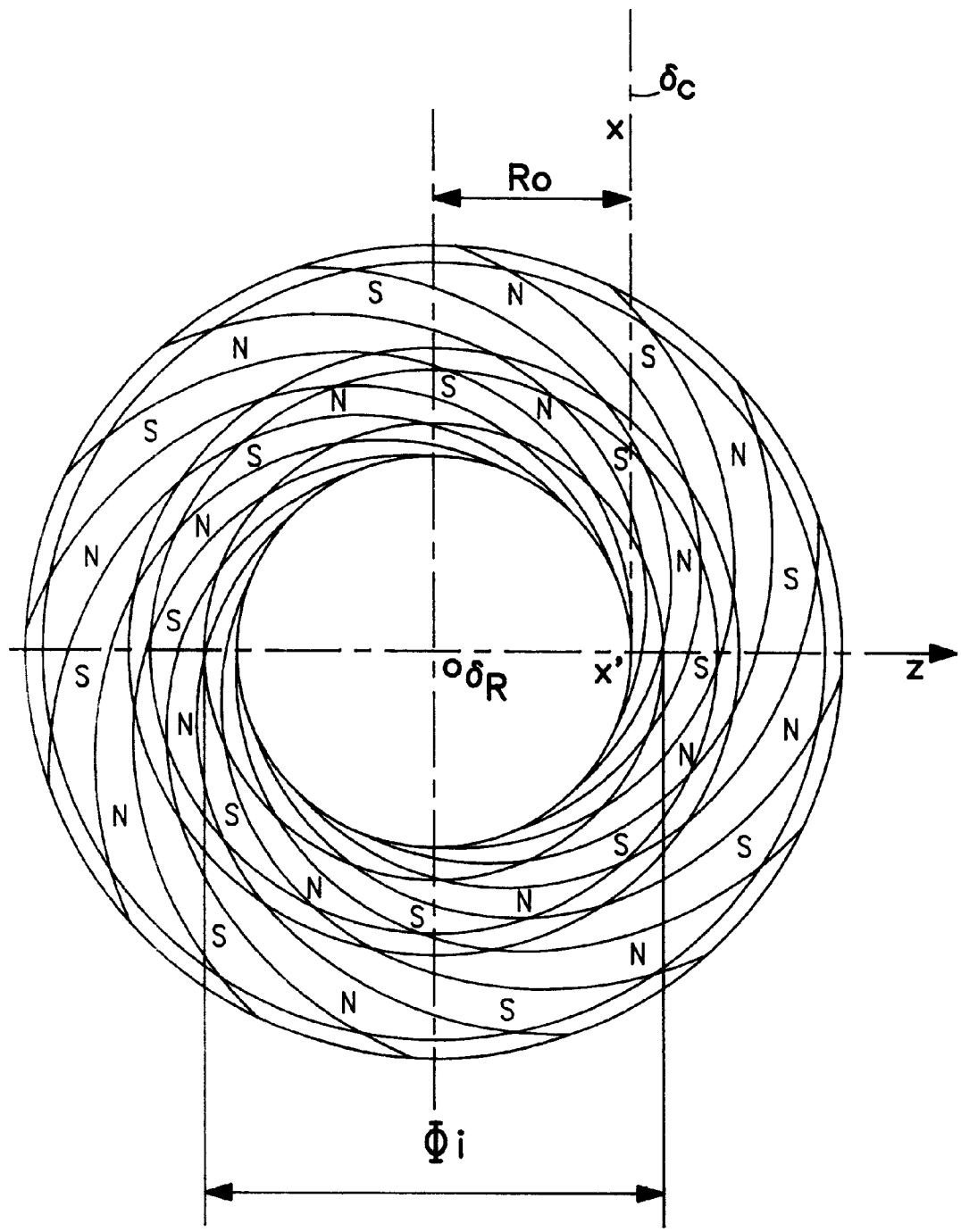

FIG. 6 shows that from the path of FIG. 4, it is possible to construct an infinite number of annular encoders having different diameters and/or widths presenting the above-described advantages. The two conditions to be implemented are, first, that the internal diameter $\Phi_i$ of the chosen encoder is not less than twice the distance $R_0$ between the two axes $\delta_C$ and $\delta_R$ and, on the other hand, that the centers of the sensing elements of the sensor are located on the axis $\delta_C$, both opposite the encoder. There is no limitation concerning the external diameter; the spiral transitions can be extended beyond the path, which is necessarily limited, of the present figure without losing the advantages of the invention.

It is also possible, based on FIG. 5, to construct an infinity of annular encoders according to the invention.

Figure 7:
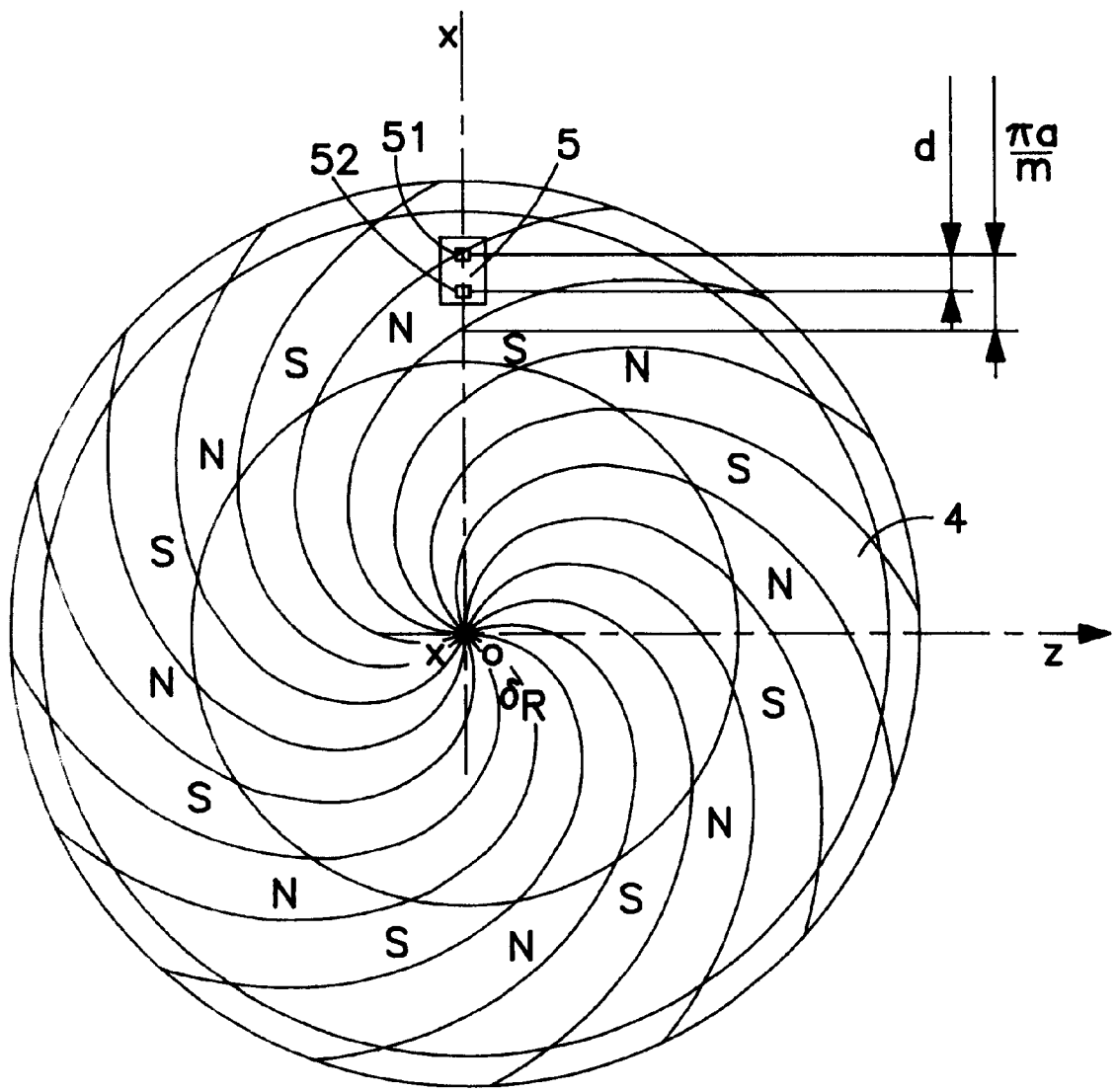

FIG. 7 represents another nonlimiting example of the multipolar encoder 4 whose magnetic transitions in spirals are defined according to one of the above equations $\mu$ and $\theta$, with a distance $R_0$ of zero. The axis $\delta_C$ on which the centers of the sensing elements of the sensor are located passes through the center 0 of the encoder and it intercepts the succession of the transitions at a constant pitch equal to $\pi a/m$, whereas the circumferential pitch is by construction equal to $\pi/m$. The two sensing elements 51 and 52, separated by distance d, of the sensor 5 thus operate under the same condition of signal phase shift as in the preceding examples.

Figure 8:
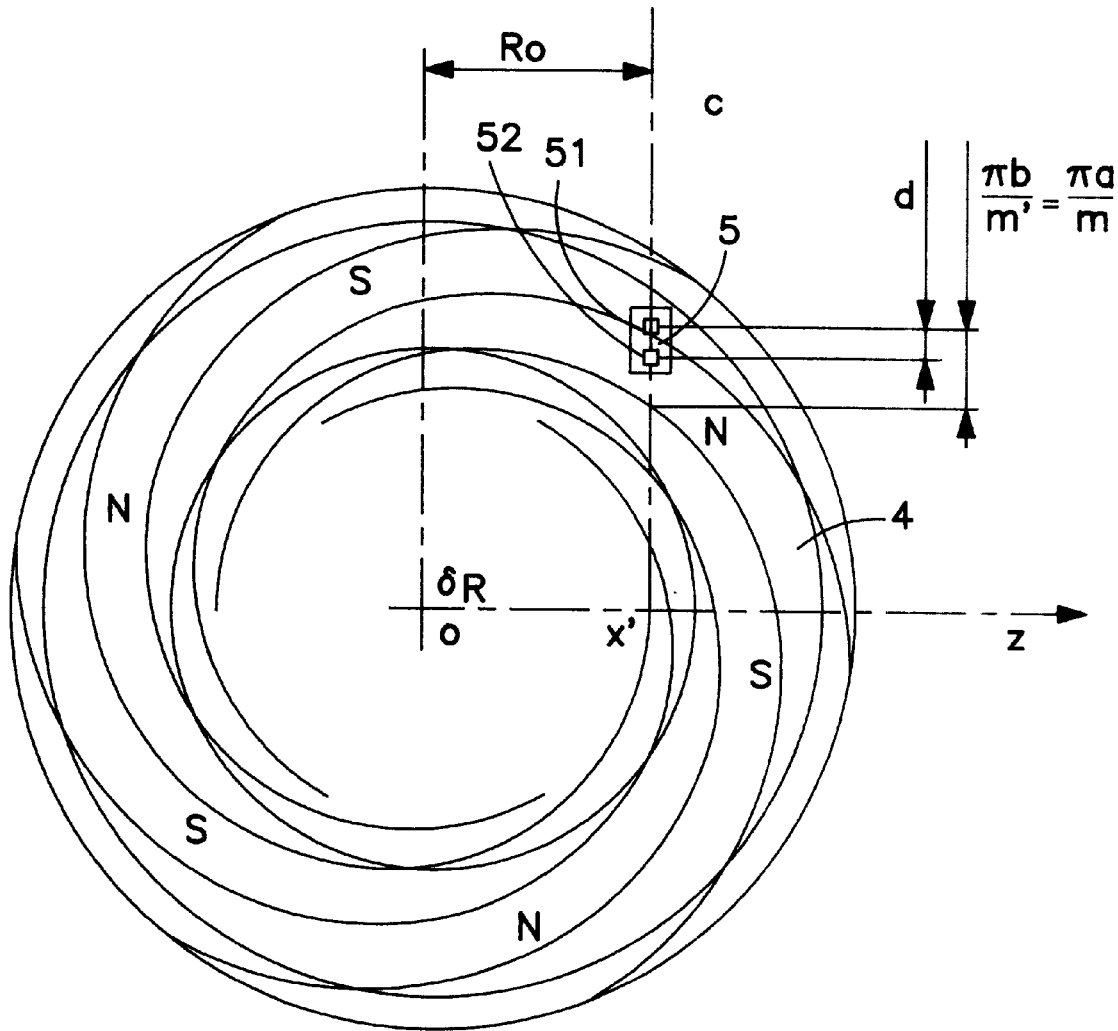

FIG. 8 represents another nonlimiting embodiment example of an annular multipolar encoder 4, whose magnetic transitions were generated by the polar coordinates between the north and south poles:

$$\mu = (R_o^2 + b^2\Omega^2)^{1/2}$$

$$\theta = \left(\arctan\frac{b\Omega}{R_o}\right) - \Omega$$

and successive rotations by angles $\pi/m'$, where b is a constant of the spiral different from a, and m is the number of periods different from m but connected by the equation: $b/m' = a/m$.

The axis $\delta_C$ with origin X' located on the axis 0z at a distance $R_0$ from the center of the encoder 4 passing through the centers of the sensing elements 51 and 52 of the sensor 5 intercepts the succession of transitions at a constant pitch equal to $\pi b/m'=\pi a/m$, whereas the circumferential pitch is by construction equal to $\pi/m'$. The sensor 5, consisting of two sensing elements 51 and 52, whose centers, separated by a distance d, are carried by the axis $\delta_C$, thus operates under the same signal phase shift situation as in the preceding examples, whereas the number of transitions or the number of magnetic periods of the encoder is different.

The conclusions are thus identical with any encoder obtained with any one of the systems of equations $\mu$, $\theta$.

The nonlimiting examples presented in FIGS. 4, 5, 6, 7 and 8 show an essential characteristic of the invention, according to which a unique sensor consisting of two sensing elements, whose centers are separated by a distance having a value d, allows the construction of any sensing device when it is associated with annular encoders whose magnetized face has an alteration of 2 m north and south poles with circumferential advance, or m magnetic periods, provided that the transitions between the poles satisfy one of the following systems of equations, using polar coordinates:

$$\mu = (R_o^2 + a^2\Omega^2)^{1/2}$$
$$\theta = \left(\arctan\frac{a\Omega}{R_o}\right) + \Omega$$

or $$\mu = (R_o^2 + a^2\Omega^2)^{1/2}$$
$$\theta = \left(\arctan\frac{a\Omega}{R_o}\right) - \Omega$$

and provided that each of the transitions of an encoder is derived from the immediately consecutive transition obtained by rotation by an angle $\pi/m$ with respect to the center of the encoder.

Thus, the semi-axis $\delta_C$ with origin X' corresponding to its intersection in facial projection with the axis 0z which is the origin of the phase angles, located at a distance $R_0$ from the center of the encoder, bears the centers of the sensing elements of the sensor in any position opposite the encoder, whose internal diameter is at least equal to 2 $R_0$. The value of $R_0$ which depends on the choice of the designer can assume any value starting with zero.

The spiral parameter a is defined, for each new encoder design, with respect to the distance d of the centers of the sensing elements of the sensor and with respect to the number of magnetic periods m supported by the encoder, by the following equation:

$$a = \frac{2d*m}{\pi}$$

so that the two output signals of the sensing elements of the sensor are in quadrature.

Figure 9:
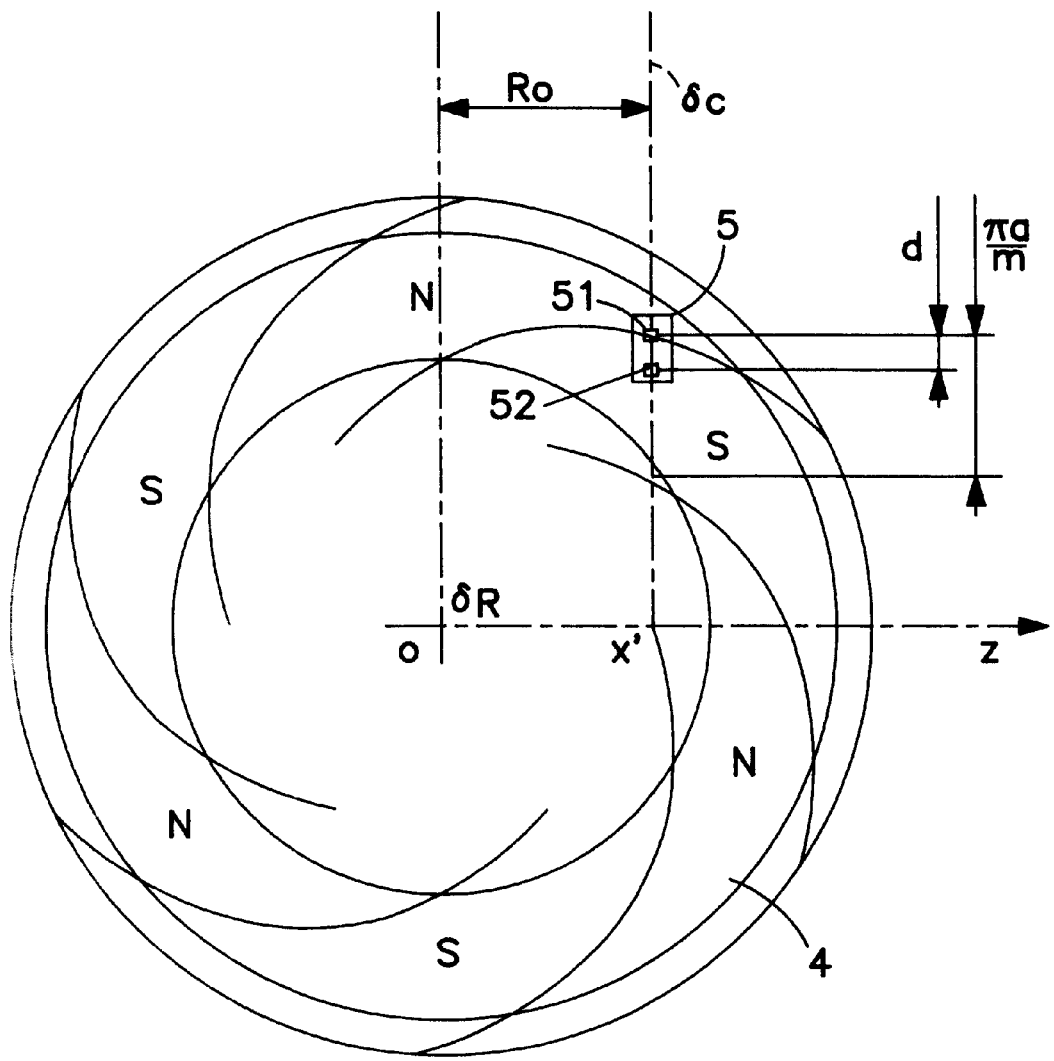

FIG. 9 illustrates another design of the measuring device where the phase shift of the output signals of the sensing elements 51 and 52 of the sensor 5 is different from quadrature. This choice can be made, for example, to allow a simplification of the construction of the encoder 4 or a greater miniaturization of the sensor 5, by decreasing the distance d of the centers of the sensing elements 51 and 52. The chosen phase shift value can be standardized for all the designs of speed sensing devices, and it is then also possible to provide a standardized processing of the signals of the sensor 5, and thus maintain the benefit of the existence of a single sensor 5 for all the designs of speed sensing devices or position sensing devices.

Under these hypotheses, the constant a of the spiral representing a magnetic transition between two north and south poles, according to one of the systems of polar equations, is given as a function of the distance d between the centers of the sensing elements 51 and 52 of the sensor 5 and of the number m of periods of the encoder 4 by the equation:

$$a=d*m*1/\Gamma$$

where $\Gamma$ is the phase angle of the two signals delivered by the sensor, expressed in radians.

For particular applications of the speed or position sensing devices, a lack of precision with regard to the state of quadrature or the phase shift of the signals delivered by the sensors can be improved, allowing simplifications in obtaining the magnetic north-south transitions of the encoders.

Figure 10:
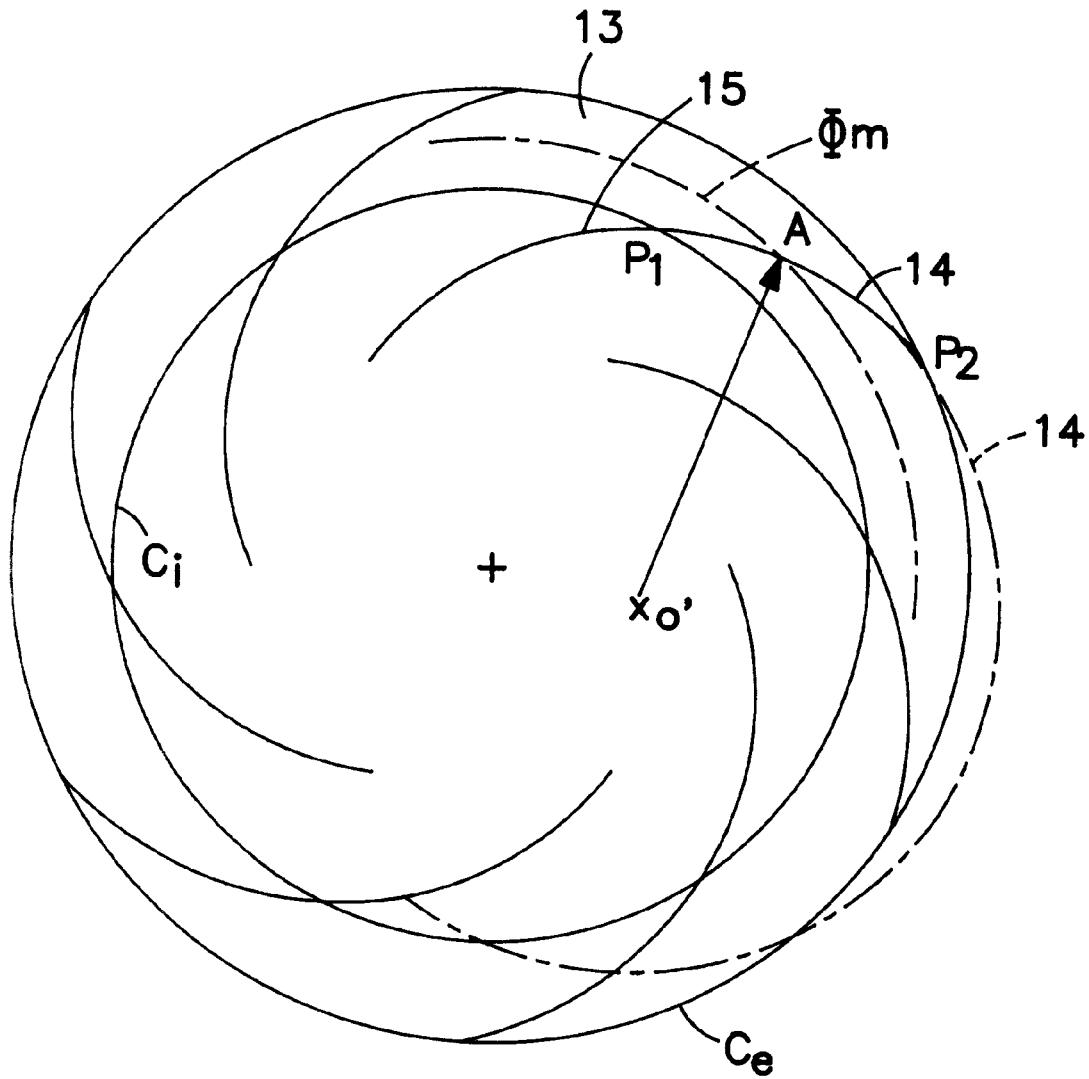
FIGS. 10 and 11 illustrate two simplified embodiments of a magnetic encoder according to the invention.

FIG. 10 illustrates, for an annular encoder 13 with small width, a possibility of simplification which consists in replacing the magnetic transition between two poles, north and south, on an arc of a spiral by a magnetic transition on an arc of a circle 14 with radius r, centered over the center of curvature O' of the point A of the spiral 15, located at the mean diameter $\Phi_m$ of the encoder. The means for the calculation of this radius of curvature and of the position of the center of curvature are known. Another possibility is to use a transition in an arc of a circle 14 instead of the spiral transition 15 for its part between the internal circumference $C_I$ and the external circumference $C_e$ of the encoder, which consists in choosing the arc of a circle which is closest to the axis of the spiral by a method of minimization of the mean of the quadratic distances of the two paths.

Figure 11:
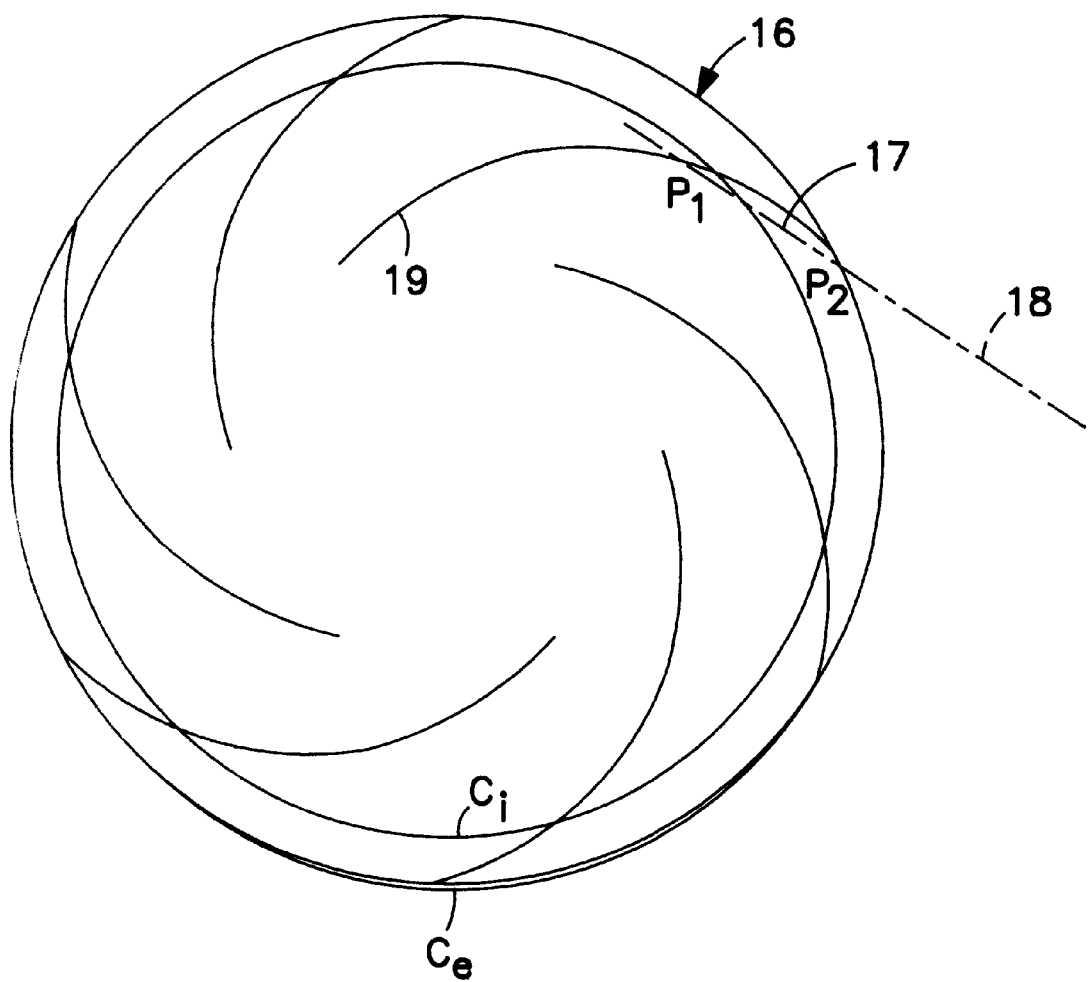

FIG. 11 illustrates another possibility of a simplified embodiment of an annular encoder 16 with small width which consists in replacing the magnetic transition 19 between two poles, north and south, on an arc of a spiral by a linear magnetic transition 17. The straight line 18 defining the position of the magnetic transition 17 can be either a tangent to the spiral at half radius from the encoder 16, or it can be a secant passing through the two points $P_1$ and $P_2$ of intersection of the spiral with the internal circumference $C_i$ and the external circumference $C_e$, respectively, of the encoder ring 16. The straight line 18 can also be the secant through the arc of the spiral whose position minimizes the mean of the squared deviations from the distance between the spiral and the straight line over the width of the annular magnet.

Finally, the positions of symmetry with respect to the center of the encoder or any of the axes passing through this center, for any of the above-described cases, are a part of the present invention.

Having described the invention, what is claimed is:

1. A device for measuring the position and the speed of a rotating moving shaft, the device comprising:

a fixed sensor having at least two sensing elements, delivering sinusoidal signals, and mounted with a constant gap opposite a magnetized face of an annular multipolar encoder, centered over the shaft and integrally connected to it without rotational play;

wherein an axis ($\delta_C$) of the sensor (5) having the centers of two sensing elements (51 and 52) is located at a distance ($R_0$) from the axis ($\delta_R$) of rotation of the magnetic encoder (4) and wherein the encoder (4) has on its magnetized face (6) 2 m magnetic transitions between poles of opposite polarity, north and south, in the form of spirals whose path of the first transition is defined in polar coordinates ($\mu$, $\theta$) by the equations:

$$\mu = (R_o^2 + a^2\Omega^2)^{1/2}$$

$$\theta = \left(\arctan\frac{a\Omega}{R_o}\right) + \Omega$$

and the path of the (2 m−1) other spiral transitions is obtained by successive rotations by angles $\pi/m$ of this first transition around the center (0) of the encoder, equations in which $\Omega$ is the angle of rotation of the encoder around its center (0), $\mu$ is the modulus of the spiral measured from the center (0) of the encoder (4), $\theta$ is the argument of the spiral measured from its origin on the axis (0z) on which is measured the distance between axes ($R_O$), and a is a parameter of eccentricity of the spiral defined by the equation:

$$a=d*m*1/\Gamma$$

in which $\Gamma$ represents the phase angle between the two signals delivered by the two sensing elements (51 and 52) of the sensor (5), d represents the distance between the centers of the sensing elements of the sensor, and m represents the number of magnetic periods of the encoder.

2. A device for measuring the position and the speed of a rotating moving shaft, the device comprising:

a fixed sensor having at least two sensing elements, delivering sinusoidal signals, and mounted with constant gap opposite the magnetized phase of an annular multipolar encoder, centered around the shaft and integrally connected to it without rotational play;

wherein an axis ($\delta_C$) of the sensor (5) having the centers of the two sensing elements (51 and 52) is located at a distance ($R_O$) from the axis ($\delta_R$) of rotation of the magnetic encoder (4), and wherein the encoder (4) has, on its magnetic face (6) 2 m magnetic transitions between poles of opposite polarity, north and south, in the form of spirals whose path of the first transition is defined in polar coordinates ($\mu$, $\theta$) by the equations:

$$\mu = (R_o^2 + a^2\Omega^2)^{1/2}$$

$$\theta = \left(\arctan\frac{a\Omega}{R_o}\right) - \Omega$$

and the path of the (2 m−1) other spiral transitions is obtained by successive rotations by angles ($\pi/m$) of this first transition around the center of the encoder, equations in which S is the angle of rotation of the encoder around its center (0), $\mu$ is the modulus of the spiral measured from the center (0) of the encoder (4), $\theta$ is the argument of the spiral measured from its origin on the axis (0z) on which is measured the distance between axes ($R_O$), and a is a parameter of eccentricity of the spiral defined by the equation:

$$a=d*m*1/\Gamma$$

in which $\Gamma$ represents the phase angle between the two sensing elements of the sensor, d represents the distance between the centers of the sensing elements of the sensor, and m represents the number of magnetic periods of the encoder.

3. A measuring device according to claim 1, wherein the distance ($R_O$) between the axis ($\delta_R$) of rotation of the encoder (4) and the axis ($\delta_C$) of the sensor (5) is zero.

4. A measuring device according to claim 1, wherein the phase angle ($\Gamma$) between the two signals delivered by the two sensing elements (51) and (52) of the sensor (5) has a value equal to an odd number multiplied by $\pi/2$, that locates the sensing elements of the sensor in a situation of quadrature in the magnetic field of the encoder.

5. A measuring device according to claim 1, wherein the phase angle ($\Gamma$) between the two signals delivered by the sensing elements (51) and (52) of the sensor (5) has a value of less than $\pi/2$ corresponding to a small value of the distance (d) between the sensing elements, and wherein the sensor has a unique means for electronic orthogonalization of the signals delivered by the sensing elements.

6. A measuring device according to claim 1, wherein the internal diameter ($\Phi_i$) of the annular encoder (4) is greater than twice the distance between the axes ($R_O$).

7. A measuring device according to claim 1, wherein the magnetic transitions of the annular encoder are on arcs of circles (14), whose radii and positions of their centers correspond to the radii of curvature (r) and to the positions of the centers of curvature (O') of the points of spirals (15) located at the mean diameter ($\Phi_m$) of the annular magnetic encoder (4).

8. A measuring device according to claim 1, wherein the magnetic transitions of the annular encoder are on arcs of circles (14), whose paths are obtained by a method that minimizes the mean of the squared distances between the path on an arc of a circle and the path on an arc of a spiral (15) for each of the transitions.

9. A measuring device according to claim 1, wherein the magnetic transitions of the annular encoders are linear (17), and their paths correspond to tangents (18) at the points of spirals located at the mean diameter ($\Phi_m$) of the annular magnetic encoder.

10. A measuring device according to claim 1, wherein the magnetic transitions of the annular encoders are linear (17), and their paths are obtained by a method minimizing the mean of the squared distances between the paths on an arc of a spiral (19) and the straight line for each of the transitions.

11. A measuring device according to claim 1, wherein the magnetic transitions of the annular magnetic encoders are linear secants of the spirals, each linear transition passing through two extreme points ($P_1$ and $P_2$) of each spiral transition belonging to the surface of the annular encoder.

12. A measuring device according to claim 1, wherein the axis of the sensor marking the center of the sensing element is maintained in a known position in the device, regardless of the means of fixing of the sensor.

13. A measuring device according to claim 2, wherein the distance ($R_O$) between the axis ($\delta_R$) of rotation of the encoder (4) and the axis ($\delta_C$) of the sensor (5) is zero.

14. A measuring device according to claim 2, wherein the phase angle ($\Gamma$) between the two signals delivered by the two sensing elements (51) and (52) of the sensor (5) has a value equal to an odd number multiplied by $\pi/2$, that locates the sensing elements of the sensor in a situation of quadrature in the magnetic field of the encoder.

15. A measuring device according to claim 2, wherein the phase angle ($\Gamma$) between the two signals delivered by the sensing elements (51) and (52) of the sensor (5) has a value of less than $\pi/2$ corresponding to a small value of the distance (d) between the sensing elements, and wherein the sensor has a unique means for electronic orthogonalization of the signals delivered by the sensing elements.

16. A measuring device according to claim 2, wherein the internal diameter ($\Phi_i$) of the annular encoder (4) is greater than twice the distance between the axes ($R_O$).

17. A measuring device according to claim 2, wherein the magnetic transitions of the annular encoder are on arcs of circles (14), whose radii and positions of their centers correspond to the radii of curvature (r) and to the positions of the centers of curvature (O') of the points of spirals (15) located at the mean diameter ($\Phi_m$) of the annular magnetic encoder (4).

18. A measuring device according to claim 2, wherein the magnetic transitions of the annular encoder are on arcs of circles (14), whose paths are obtained by a method that minimizes the mean of the squared distances between the path on an arc of a circle and the path on an arc of a spiral (15) for each of the transitions.

19. A measuring device according to claim 2, wherein the magnetic transitions of the annular encoders are linear (17), and their paths correspond to tangents (18) at the points of spirals located at the mean diameter ($\Phi_m$) of the annular magnetic encoder.

20. A measuring device according to claim 2, wherein the magnetic transitions of the annular encoders are linear (17), and their paths are obtained by a method minimizing the mean of the squared distances between the paths on an arc of a spiral (19) and the straight line for each of the transitions.

21. A measuring device according to claim 2, wherein the magnetic transitions of the annular magnetic encoders are linear secants of the spirals, each linear transition passing through two extreme points ($P_1$ and $P_2$) of each spiral transition belonging to the surface of the annular encoder.

22. A measuring device according to claim 2, wherein the axis of the sensor marking the center of the sensing element is maintained in a known position in the device, regardless of the means of fixing of the sensor.

\* \* \* \* \*